United States Patent [19]

Sawa et al.

[11] Patent Number: 4,776,218
[45] Date of Patent: Oct. 11, 1988

[54] PRESSURE SENSING DEVICE

[75] Inventors: Takao Sawa, Yokohama; Masaki Sahashi, Fujisawa; Susumu Hashimoto; Akira Ishii, both of Tokyo, all of Japan

[73] Assignee: Kabushiki Kaisha Toshiba, Kawasaki, Japan

[21] Appl. No.: 96,779

[22] Filed: Sep. 14, 1987

Related U.S. Application Data

[63] Continuation of Ser. No. 935,110, Nov. 24, 1986, abandoned, which is a continuation of Ser. No. 779,113, Sep. 23, 1985, abandoned.

Foreign Application Priority Data

Sep. 29, 1984 [JP] Japan .................. 59-204879

[51] Int. Cl.$^4$ ............... G01L 7/08; G01L 9/06
[52] U.S. Cl. ........................ 73/721; 73/727; 92/103 M; 338/4
[58] Field of Search ................. 73/715–729, 73/753, 706; 92/103 M; 361/283, 20; 338/4, 42

[56] References Cited

U.S. PATENT DOCUMENTS 4,412,454 11/1983 Yamashita et al. ............. 73/728

FOREIGN PATENT DOCUMENTS

| 0080186 | 6/1983 | European Pat. Off. . |
| 3132848 | 3/1983 | Fed. Rep. of Germany . |
| 5753636 | 9/1980 | Japan . |
| 5950331 | 9/1982 | Japan . |

Primary Examiner—Donald O. Woodiel
Attorney, Agent, or Firm—Oblon, Fisher, Spivak, McClelland & Maier

[57] ABSTRACT

A pressure sensing device of this invention has a first diaphragm for defining a first pressure transmission chamber within a housing assembly with a pressure transmission fluid sealed therein and a second diaphragm for defining a second pressure transmission chamber within the housing assembly with a pressure transmission fluid sealed therein. The pressures of first and second measuring fluids both act upon the side opposite to that on which the corresponding diaphragm faces the corresponding pressure transmission chamber. The first and second diaphragms are both formed of a metal sheet having the modulus of 2,000 to 15,000 Kg/mm$^2$. A pressure-sensing element is disposed between the pressure transmission chambers to sense a differential pressure level between the pressure transmission chambers.

5 Claims, 1 Drawing Sheet

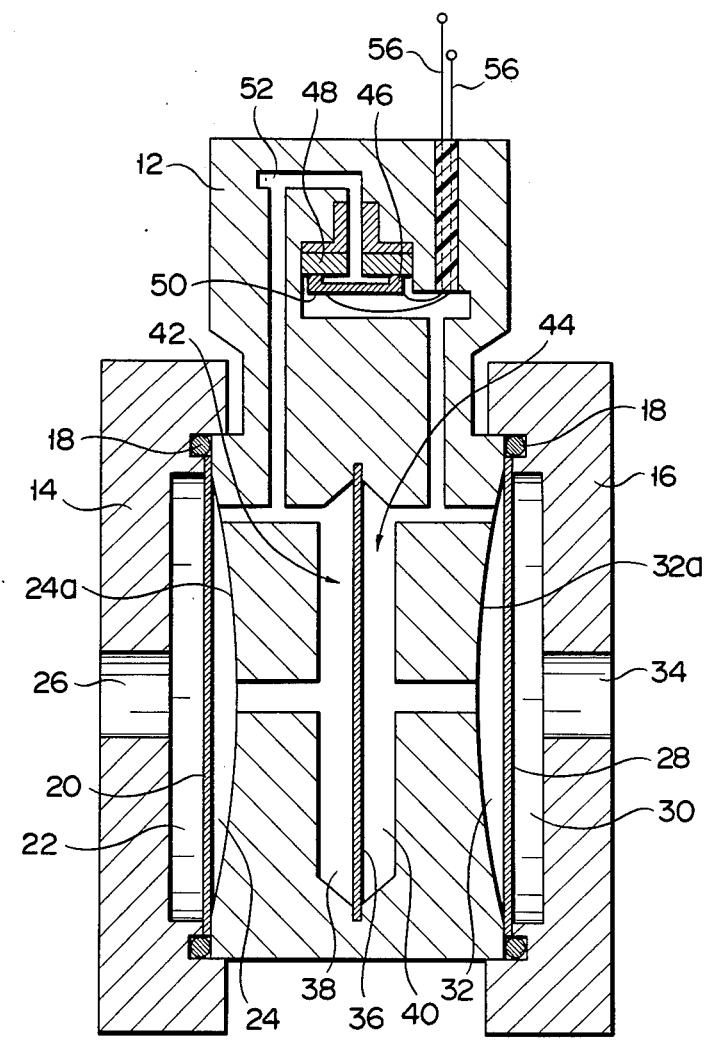

PRESSURE SENSING DEVICE

This application is a continuation of application Ser. No. 935,110, filed on Nov. 24, 1986, now abandoned, which is continuation of application Ser. No. 779,113, filed on Sept. 23, 1985, now abandoned.

BACKGROUND OF THE INVENTION

This invention relates to a pressure sensing device for sensing the pressure of a fluid and, in particular, a pressure sensing device using a diaphragm upon which pressure is exerted.

A pressure sensing device of this type is known as the so-called differential pressure transmitter or pressure transmitter. To explain it in more detail, for example, the differential pressure transmitter includes a first metallic diaphragm for defining a first chamber and a second metallic diaphragm for defining a second chamber. A predetermined fluid is sealed in the first and second chambers. The pressure of the first measuring fluid externally acts upon the first diaphragm, transmitting the pressure of the first measuring fluid to the internal fluid within the first chamber. The pressure of the second measuring fluid externally acts upon the second diaphragm, transmitting the pressure of the second measuring fluid to the internal fluid within the second chamber as in the case of the first chamber. A pressure-sensitive element is disposed between the first and second chambers. The pressure-sensitive element has a first surface responsive to the pressure within the first chamber and a second surface responsive to the pressure within the second chamber and is adapted to generate an electric signal corresponding to the differential pressure between the pressure in the first chamber and that in the second chamber. The above-mentioned differential pressure transmitter permits the pressures of the first and second measuring fluids to be transmitted to the first and second chambers, respectively, and detects the first and second measuring fluids through the use of the above-mentioned pressure-sensitive element.

In this connection it is to be noted that the pressure transmitter also permits the pressure within the internal chamber to be transmitted through the diaphragm and measures it on the pressure-sensitive element and that the pressure transmitter is operated basically on the same principle as that of the differential pressure transmitter.

As appreciated from the operation principle of the differential pressure transmitter and pressure transmitter, in order to obtain a highly exact output level on the pressure transmitter of this type, it is necessary to better transmit the pressure of the measuring fluid to the fluid within the internal chamber defined by the diaphragm, so that the pressure variation within the internal chamber can be followed, with high accuracy, with respect to the pressure variation of the measuring fluid. In order to satisfy such a requirement, either the thickness of the diaphragm should be decreased or the cushioning or springing characteristic of the diaphragm should be reduced with a greater effective diameter, so that the diaphragm may readily be deformed in accordance with the pressure of the measuring fluid.

A stainless steel, such as SUS316L (Japanese Industrial Standards), is usually used for the diaphragm for the known pressure transmitter. Where, however, the thickness of the diaphragm is reduced below a desired springing level so as to obtain an exact output characteristic, the mechanical strength of the diaphragm is reduced with the decreasing thickness of the diaphragm. As a result, the diaphragm is damaged, failing to reduce it in actual practice. For this reason, the stainless steel diaphragm has a drawback that the thickness of the diaphragm cannot be adequately reduced. For the stainless steel diaphragm, if the thickness is adequately reduced below the desired level, it is unavoidably necessary to employ a diaphragm of a greater effective diameter. As a result, the pressure transmitter per se becomes bulkier.

SUMMARY OF THE INVENTION

It is accordingly an object of this invention to provide a pressure sensing device which can be formed as a compact unit and, in spite of this, can obtain an output characteristic of high accuracy.

In order to achieve the above-mentioned output characteristic, a pressure-sensing device as set out below is implemented, paying particular attention to the relation of the modulus of longitudinal elasticity, E, of a metallic diaphragm to the rate of transmission of the fluid pressure acting upon the diaphragm. The pressure-sensing device of this invention comprises a housing assembly defining a chamber therein; at least one diaphragm disposed within the chamber of the housing assembly and made of a metal having the modulus of longitudinal elasticity, E, of 2,000 to 15,000 $Kg/mm^2$, the diaphragm dividing the chamber of the housing into a first fluid chamber supplied with a measuring fluid and a second fluid chamber sealing a pressure transmission fluid therein, the pressure in the first fluid chamber being transmitted to the pressure transmission fluid within the second fluid chamber through the diaphragm, and sensing means for sensing a variation in the pressure transmission fluid within the second fluid chamber and for delivering as an output signal a pressure signal to be sensed.

As is evident from the pressure sensing device of this invention, since the diaphragm is made of a metal having the modulus of longitudinal elasticity, E, of 2,000 to 15,000 $Kg/mm^2$, the springing or cushioning characteristic of the diaphragm can be reduced as compared with those of the diaphragm made of a conventional stainless steel ($E=20,000$ $Kg/mm^2$). In consequence, upon comparison between the diaphragm of this application and the conventional diaphragm the pressure of the measuring fluid within the first fluid chamber can be effectively transmitted t that within the second fluid chamber, provided that these diaphragms have the same effective diameter and the same thickness. In other words, the diaphragm of this invention can reduce the pressure transmission loss as compared with the conventional diaphragm. As a result, since the pressure variation of the pressure transmission fluid within the second chamber can better be followed with respect to the pressure variation of the measuring fluid within the first fluid chamber, it is possible to sense the pressure variation of the measuring fluid with high accuracy. Provided that the same pressure transmission loss level is involved between the diaphragm of this invention and the conventional stainless steel diaphragm, the effective diameter of the diaphragm of this invention can be made smaller than in the conventional diaphragm. In consequence, the pressure sensing device of this invention can be made more compact as compared with the conventional counterpart.

As evident from the comparison between the diaphragm of this invention and the conventional diaphragm, the former diaphragm can be made smaller in pressure transmission loss level and more compact than the latter diaphragm.

It may be added that, if the modulus of longitudinal elasticity, E, of the diaphragm is below 2,000 Kg/mm$^2$, the mechanical strength (fatigue strength) of the diaphragm per se is reduced, failing to obtain a practical unit with respect to its withstand characteristic.

Although, as a metal suitable for the diaphragm of this invention, use has been made of a crystalline metal sheet, such as an aluminum alloy, titanium alloy, beryllium alloy and copper alloy, and a metal sheet obtained by rapidly quenching a molten metal, a metal sheet made of an amorphous alloy may also be used as a proper metal. Where the diaphragm made of the amorphous alloy is used, even if the modulus of longitudinal elasticity is smaller than that of the diaphragm made of the crystalline metal alloy, it is still possible to suppress a possible, consequent decrease in the mechanical strength. Thus, the diaphragm of this invention reveals an excellent withstand characteristic, and an improved quality, over the conventional diaphragm.

Where the amorphous alloy of which the diaphragm is made is a Ni-based amorphous alloy of a nonmagnetic type, the modulus of longitudinal elasticity does not vary under an external magnetic field. The diaphragm of this invention will reveal a stable pressure transmission characteristic in spite of a surrounding environment under an external magnetic field.

If the amorphous alloy of which the diaphragm is made is of a nonmagnetic Ni-based type and contains at least one element selected from the group consisting of Cr, Cu and the elements of the platinum group, it is possible to provide an excellent corrosion-resistant diaphragm free from any bad influence resulting from an external magnetic field.

BRIEF DESCRIPTION OF THE DRAWING

The drawing attached thereto is a cross-sectional view diagrammatically showing a differential pressure transmitter according to one embodiment of this invention.

DETAILED DESCRIPTION OF THE PREFERRED EMBODIMENTS

As shown in the drawing, a differential pressure transmitter according to this invention includes a housing 10 comprised of an internal housing 12 and left and right external housing units 14 and 16 mounted on the internal housing 12 through O-rings 18. A chamber is defined between the internal housing 10 and the left external housing 14. The chamber is divided by a first metallic diaphragm 20 into a first measuring fluid chamber 22 and a first internal chamber 24. Here, the first diaphragm 20 is comprised of a thin metal sheet having the modulus of longitudinal elasticity of 2,000 to 15,000 Kg/mm$^2$. As a proper metal sheet for the first diaphragm 20, use may be made of, for example, a crystalline metal sheet, such as aluminum alloy, titanium alloy, beryllium alloy or copper alloy or a metal sheet obtained by rapidly quenching a molten metal. A first conducting hole 26 is formed in the left external housing unit 14 to communicate with the first measuring chamber 22, and the first measuring fluid at the lower pressure side flows into the first measuring fluid chamber 22 through the first conducting hole 26. A chamber is defined between the internal housing 12 and the right external housing unit 16 and divided into a second measuring fluid chamber 30 and a second internal chamber 32 by a second diaphragm 28 made of a material the same as that of the first diaphragm 20. A second conducting hole 34 is formed in the right external housing unit 16 to communicate with the second measuring fluid chamber 30, and the second measuring fluid at the high pressure side is permitted to flow into the second measuring fluid chamber 30 through the second conducting hole 34.

An intermediate chamber is defined in the internal housing 12 and divided by an intermediate diaphragm 36 into a first intermediate chamber 38 and a second intermediate chamber 40. The rigidity of the intermediate diaphragm 36 is set at more than 50 times that of the first and second diaphragms 20 and 28. The first intermediate chamber 38 communicates with the first internal chamber 24 through passages formed in the internal housing 12, and the second intermediate chamber 40 communicates with the second internal chamber 32 through passages formed in the internal housing 12. Therefore, a first pressure transmitting chamber 42 is comprised of the first internal chamber 24, first intermediate chamber 38 and passages for permitting a fluid communication to be made between these chambers, and a second pressure transmitting chamber 44 is comprised of the second internal chamber 32, second internal chamber 40 and passages for permitting a fluid communication to be made between these chambers 32 and 40. A pressure transmitting fluid is sealed into the first and second pressure transmitting chambers 42 and 44.

Furthermore, a pressure-sensitive element 46 is disposed within the internal housing 12. The pressure-sensitive element 46 is comprised of, for example, a diffusion type semiconductor and has a first pressure receiving surface 48 and a second pressure receiving surface 50. The pressure of the pressure transmitting fluid within the first pressure transmitting chamber 42 acts upon the first pressure receiving surface 48 through a first passage 52. The pressure of the pressure transmitting fluid in the second pressure transmitting chamber 44 acts upon the second pressure receiving surface 50 of the pressure-sensitive element 46 through a second passage 54. In consequence, the pressure-sensitive element 46 senses the differential pressure acting between the first and second pressure transmitting chambers 42 and 44, i.e., a differential pressure acting between the first and second pressure receiving surfaces 48 and 50 and delivers an electric signal corresponding to the differential pressure through leads 56.

In this embodiment, in order to prevent the pressure exceeding an allowable pressure and therefore acting upon the pressure-sensitive element 46, the amount of deformation of the first and second diaphragms 20 and 28 is restricted by outer surfaces 24a and 32a of the internal housing 12. That is, if the pressure of the second measuring fluid at the high pressure side acts upon the second diaphragm 28, the second diaphrAgm 28 deforms to the left in accordance with the pressure of the second measuring fluid, but if the pressure of the second measuring fluid exceeds a predetermined pressure the second diaphragm 28 is brought into contact with the outer surface 32a defining the second internal chamber 32 of the internal housing 12, restricting further deformation of the second diaphragm 28. In consequence, even if the pressure of the second measuring fluid exceeds the predetermined pressure, any pressure in excess of the allowable pressure is not transmitted to the second pressure transmitting chamber 44, positively preventing a breakage of the pressure-sensitive element 46. To the first pressure transmitting chamber 42, any pressure in excess of the allowable pressure is not transmitted as in the case of the second pressure transmitting chamber 44.

Furthermore, where the configurations of the outer surfaces 24a and 32a of the internal housing 12, which defines the first and second internal chambers 24 and 32, respectively, are the same as the deformation patterns of the first and second diaphragms 20 and 28 as shown in the drawing, the first and second diaphragms 20 and 28 can be brought into intimate contact with the outer surfaces 24a and 32a and no level excess pressure can be prevented from being exerted over the first and second diaphragms 20 and 28.

In the above-mentioned embodiment, although the first and second diaphragms 20 and 28 are formed of a crystalline metal sheet, such as the aluminium alloy, titanium alloy, beryllium alloy or copper alloy, or a metal sheet obtained by rapidly quenching the molten metal, use may also be made of a metal sheet made of an amorphous alloy. For example, the amorphous alloy having the following composition is suitable as the above-mentioned amorphous alloy.

$$(M_{1-x}T_x)_{100-m}Z_m \quad (1)$$

where x: $0 \leq x \leq 0.3$;

m: $10 \leq m \leq 40$;

M: at least one kind selected from the group consisting of Fe, Co and Ni;

T: at least one kind selected from the group consisting of Ti, Zr, Hf, V, Nb, Ta, Cu, Cr, Au, Ag, Mo, W, Mn, Re, Ru, Rh, Ir, Pt, Pd, Sn, Pb, Sb, Bi, Y and the rare earth elements; and Z: at least one of B and P, and at least one kind selected from the group consisting of Si, Ge, C and Al.

Here, the subscripts $1-x$ and x denote a ratio in the number of atoms between M and T and the subscripts $100-m$ and m denote an atomic percentage (atm%) between (MT) and Z.

If the composition elements of the amorphous alloy as shown in Equation 1, M, B and P in Z are essential elements for obtaining the amorphous alloy. T is an effective element for increasing the crystallization temperature and the amount of the element or elements in T can adjust the thermal expansion coefficient of the amorphous alloy and improve the corrosion- and heat-resistant characteristics of the amorphous alloy. When the ratio x of T to M is 0.3 or more, it is difficult to convert the alloy represented by Equation 1 to an amorphous state. In actual practice, the value of x is preferably within a range of $0.01 \leq x \leq 0.20$. Furthermore, Si, Ge, C and Al in Z are elements effective to increase the crystallization temperature and decrease the modulus of longitudinal elasticity, while maintaining the mechanical strength. The reason why the ratio m of Z to (MT) is within a range of $10 \leq m \leq 40$ is because the modulus of longitudinal elasticity cannot be adequately decreased for m of 10 or less and because it is difficult to convert the alloy indicated by Equation 1 to an amorphous state for m of 40 or more.

Table 1 below shows a comparison among Examples 1 to 10 of diaphragms manufactured to satisfy the composition of Equation 1 and References 1 to 3.

TABLE 1

| | Alloy composition | Modulus of longitudinal elasticity (kg/mm$^2$) | Tensile strength $\sigma f$ (kg/mm$^2$) | Pressure transmission loss percentage (%) |
|---|---|---|---|---|
| Example 1 | $Fe_{75}Si_{15}B_{10}$ | 12000 | 340 | 3.1 |
| Example 2 | $Co_{78}Si_{13}B_9$ | 13500 | 310 | 3.5 |
| Example 3 | $Ni_{78}Si_{10}B_{12}$ | 7400 | 240 | 1.9 |
| Example 4 | $Fe_{23}Ni_{50}Si_{13}B_{12}Ge_2$ | 10000 | 320 | 2.6 |
| Example 5 | $Co_{40}Fe_{33}Mo_5Si_{15}B_7$ | 10200 | 305 | 2.7 |
| Example 6 | $Fe_{30}Ni_{40}Co_{10}Cu_4Si_{15}B_1$ | 11000 | 310 | 2.9 |
| Example 7 | $Ni_{70}Cr_4Ru_6Si_{13}B_7$ | 7200 | 300 | 1.9 |
| Example 8 | $Ni_{74}Cr_4Nb_2Si_{12}B_8$ | 7000 | 350 | 1.8 |
| Example 9 | $Fe_{40}Ni_{30}Cr_5Si_{15}B_9C_1$ | 11000 | 340 | 2.9 |
| Example 10 | $Ni_{50}Co_{20}Cr_3Si_{16}B_9Al_2$ | 9800 | 330 | 2.6 |
| Reference 1 | SUS316L | 19700 | 45 | 5.0 |
| Reference 2 | $Fe_{80}B_{20}$ | 17000 | 350 | 4.3 |
| Reference 3 | $Co_{80}B_{20}$ | 17800 | 320 | 4.5 |

The diaphragms of Examples of this application have the compositions as shown in Table 1 and were obtained by first manufacturing a metal sheet of 50 mm in width × 30 μm in thickness (average) through a single roll method and punching a disc of 40 mm in diameter out of the metal sheet. In this connection it is to be noted that the effective diameter of the diaphragm (Example 1 to 10) is 30 mm. On the other hand, the diaphragm of Reference 1 was 50 μm in thickness and the diaphragms of Controls 2 and 3 were 30 μm, noting that the effective diameters of References 1 to 3 were 30 mm as in the case of Examples 1 to 10.

In FIG. 1, the pressure transmission loss percent is obtained from the following equation: That is, the pressure transmission loss percentage (%) =

{((the pressure of the measuring fluid) − (the pressure of the internal chamber)/

(the pressure of the measuring fluid)} · 100

As evident from Table 1, the diaphragm of References 1 to 3 reveal a greater modulus of longitudinal elasticity than that of Examples 1 to 10. From this it will be evident that the pressure transmission loss percentage is greater. In this connection it may be considered that, with the thickness of Reference 1 as 30 μm as in the case of Examples 1 to 10, the modulus of longitudinal elasticity will be further reduced. Now suppose that the diaphragm of Reference 1 is 50 μm in thickness. Since, even in this case, the tensile strength is smaller as shown in Table 1, if the thickness of the diaphragm is further reduced, it is virtually impossible for the diaphragm to act as such.

Instead of an amorphous alloy which has a composition represented by the above-mentioned Equation 1, an amorphous alloy having the following composition may be used.

$$(Ni_{1-x-y}M'_xT'_y)_{100-m}Z_m \qquad 2$$

where:

M': at least one kind of Fe and Co;

T': at least one kind selected from the group consisting of Ti, V, Mn, Zr, Nb, Mo, Hf, Ta, W and the rare earth elements;

Z: at least one kind of B and P, and at least one kind selected from the group consisting of Si, Ge, C and Al.

Here, x is within a range of $0 \leq x \leq 0.3$ where M' is Fe and x is within a range of $0 \leq x \leq 0.4$ where M is Co. y is within a range of $0 \leq y \leq 0.3$ and m is within a range of $10 \leq m \leq 40$. The subscript $1-x-y$, x, y represent the ratio between the number of atoms between Ni, M' and T' and the subscript $100-m$, m represents an atomic percent (atm %) of (Ni M' T') and Z.

If the diaphragm is manufactured from a nonmagnetic Ni-based amorphous alloy as indicated by Equation 2, it manifests an excellent pressure transmission characteristic the same as that of the diaphragm manufactured from the amorphous alloy as given by Equation 1 and, at the same time, the pressure transmission characteristic is less likely to suffer a bad influence from an external magnetic field. That is, since the amorphous alloy represented by Equation 2 is made of an alloy principally based on nickel, it is not of a ferromagnetic alloy. Thus, the diaphragm made of the amorphous alloy as indicated by Equation 2 suffers no greater change in the modulus of longitudinal elasticity under the external magnetic field and reveals a stable pressure transmission characteristic.

Where the element as indicated by M' exceeds an upper limit of the range shown, the Curie temperature of the amorphous alloy becomes greater and, therefore, the pressure transmission characteristic suffers a bad influence under the external magnetic field. The elements in T' are effective to principally improve the heat-resistant characteristic and mechanical strength of the amorphous alloy, but if the elements in T' exceed the above-mentioned upper limit is it difficult to obtain an amorphous phase indicated by Equation 2. Furthermore, if an amount y of the element or elements as indicated by T', which is to be added, are within the range of $0 \leq y \leq 0.20$, and if an amount m of element or elements as indicated by Z, which is to be added, are within the range of $12 \leq m \leq 30$, the diaphragm shows an excellent characteristic against the outer environment under the external magnetic field. Here, the addition of the element or elements is indicated by Z and the restriction of its or their addition are carried out for the same reason as that of the amorphous alloy indicated by Equation 1.

In order to examine the pressure transmission loss percentage of the diaphragm made of the amorphous alloy represented by Equation 2, a diaphragm of Example 11 was obtained by manufacturing a metal sheet of 50 mm in width×30 μm in thickness (average) having a composition of, for example, $(Ni_{0.85}Fe_{0.05}Nb_{0.10})_{77.8}Si_{10}B_{10}Ge_2$ and punching a disc of 40 mm in diameter out of the metal sheet. In this connection it is to be noted that the effective diameter of the diaphragm of Example 11 is 30 mm as in the case of Examples 1 to 10. The amorphous alloy having the above-mentioned composition acts as a paramagnet until it attains the temperature of liquid helium.

On the differential pressure transmitter using the diaphragm of Example 11, the pressure transmission loss percent was 2.0%. It is found that the pressure transmission characteristic of Example 11 is excellent in comparison with that of Reference 1. It may be added that, even in the case of a practical diaphragm having the composition of Reference 1 and an effective diameter of 60 mm, the pressure transmission loss present was 2.5%. Therefore, it is possible to obtain a small-sized differential pressure transmitter of an excellent pressure transmission characteristic on the diaphragm of Example 11 in view of the pressure transmission loss percent.

Table 2 below shows a comparison between the diaphragms of Example 12 (represented by Equation 2) and References 4 and 5 with respect to their output levels in the outer environment under the external magnetic field.

TABLE 2

|  | Alloy composition | Output signal level (V) | Output variation (V) |
| --- | --- | --- | --- |
| Example 12 | $(Ni_{0.95}Co_{0.05})_{75}Si_{15}B_{10}$ | 1.18~1.20 | 0.02 |
| Reference 4 | $(Ni_{0.4}Fe_{0.6})_{78}Si_8B_{14}$ | 0.72~1.08 | 0.36 |
| Reference 5 | SUS316L (effective diameter 60 mm) | 0.98~1.03 | 0.05 |

The diaphragm of Example 12 was obtained by manufacturing a metal sheet of 50 mm in width and 50μ in thickness (average)—represented in Table 2—through the single roll method and punching a disc of 40 mm in diameter out of the metal sheet. In the case of the diaphragm of Example 12 the effective diameter is also 30 mm. The diaphragm of Example 12 acts as a paramagnet until it attains the temperature of the liquid helium. The diaphragm of Reference 4 is the same as that of Example 12 with respect to its thickness and effective diameter, but its composition is different and it has a Curie temperature of 350° C. The diaphragm of Reference 5 is the same in thickness as that of Example 12, but its composition and effective diameter are different. It may be added that Reference 1 is the same as Reference 5 except for their effective diameter only.

In the differential pressure transmitter using the diaphragms of Example 12 and References 4 and 5, the output signals of the pressure-sensitive elements 46 were examined under the fifth environment of different magnetic field strengths, the results of which are shown in Table 2. From Table 2 it is found that, upon comparison between the differential pressure transmitter using the diaphragm of Example 12 and the differential pressure transmitter using the diaphragm of References 4 and 5, the pressure-sensitive element of the former has a smaller output variation than the pressure-sensitive element of the latter. In other words, the differential pressure transmitter using the diaphragm of Example 12 can reduce a bad influence from the external magnetic field to a smaller extent to provide an excellent characteristic against the environment. In Table 2, the reason why the output signal level is greater in Example 12 than in References 4 and 5 is because the pressure transmission loss percentage of the diaphragm is smaller in Example 12 than in References 4 and 5 In consequence, the differential pressure transmitter of this invention can exactly sense the differential pressure between the two measuring fluids as compared with that of References 4 and 5.

Furthermore, Table 3 below shows a comparison between the diaphragm of Examples 14 to 17 (made of an amorphous alloy satisfying Equation 2) and that of References 1 and 2 with respect to the effect of the pressure transmission loss percentage of the diaphragms upon the external magnetic field.

TABLE 3

| | Alloy composition | Pressure loss percentage (%) | Width variation |
|---|---|---|---|
| Example 13 | $(Ni_{0.7}Fe_{0.2}Nb_{0.1})_{77}Si_{13}B_{10}$ | 1.9 ~ 2.2 | 0.3 |
| Example 14 | $(Ni_{0.7}Co_{0.2}Mo_{0.05}W_{0.05})_{75}Si_{10}B_{12}Ge_3$ | 1.8 ~ 2.2 | 0.2 |
| Example 15 | $(Ni_{0.6}Co_{0.2}Fe_{0.1}Mn_{0.05}Ta_{0.05})_{80}Si_8B_{10}C_2$ | 2.0 ~ 2.1 | 0.1 |
| Example 16 | $(Ni_{0.95}Co_{0.05})_{76}Si_{12}B_{10}Al_2$ | 1.9 ~ 2.1 | 0.2 |
| Reference 1 | SUS316L | 5.0 ~ 5.3 | 0.3 |
| Reference 2 | $Fe_{80}B_{20}$ | 4.3 ~ 6.5 | 2.2 |

Table 3 shows the compositions of Examples 13 to 16 which are the same as Example 12 with respect to the thickness and effective diameters.

In Table 3, the diaphragms of Examples 13 to 16 and References 1 and 2 were examined under the five environments of different magnetic field strengths to see how the pressure transmission loss percentage varies. As evident from Table 3, the diaphragms of Examples 13 to 16 are smaller in their pressure transmission loss percentage, and equal or smaller in their pressure transmission loss percentage, than References 1 and 2.

According to this invention it is possible to employ an amorphous alloy represented by the following formula:

$$(M_{1-x}T''_x)_{100-m}Z_m \qquad (3)$$

where:
M: at least one kind selected from the group consisting of Fe, Co and Ni;
T'': at least one kind selected from Cr, Cu, and the elements of the platinum group; and
Z: at least one kind of B and P, and at least one kind selected from the group consisting of Si, Ge and Al, and where x is within a range of $0.02 \leq x \leq 0.30$; m is $10 \leq m \leq 40$; the subscripts $1-x$, x denote a ratio between M and T''; and the subscripts $100-m$, m denote an atomic percent (atm %) of (M T'') and $Z_m$.

In the diaphragm use is made of the amorphous alloy represented by Equation 3, as it can reduce the pressure transmission loss percentage as compared with the conventional diaphragms and improve the corrosion resistance since the element or elements in T are contained in the composition if the diaphragm of this invention.

The reason why an amount of x in T'' to be added is restricted to the range of $0.2 \leq x \leq 0.30$ is because a better advantage of improving the corrosion resistance of the diaphragm is not expected for $x < 0.02$ and it is difficult, for $x > 0.30$, to amorphize the alloy represented by Equation 3. The reason for the addition of the element or elements in Z is as set out above.

Finally, the diaphragm of this invention may be formed of an amorphous alloy represented by the following formula:

$$(Ni_{1-x-y-z}M'_xT'_yT''_z)_{100-m}Z_m \qquad (4)$$

where

M': at least one kind of Fe and Co;
T': at least one kind selected from the group consisting of Ti, V, Mn, Zr, Nb, Mo, Hf, Ta, W and the rare earth elements;
T'': at least one kind selected from Cr, Cu and the elements of the platinum group; and
Z: at least one kind of B and P and at least one kind selected from the group consisting of Si, Ge, C and Al, and where x is within a range of $\leq 0.3$ for M'=Fe and x is within a range of $x \leq 0.4$ for M'=Co and where $0 \leq y \leq 0.20$; $0.02 \leq Z \leq 0.20$; $0.02 \leq y+z \leq 0.30$ and $10 \leq m \leq 40$. The subscripts of $1-x-y-z$, x, y and z show a ratio in the number of atoms between, Ni, M', T' and T'' and the subscripts of $100-m$, m show an atomic percentage (atm %) of (Ni M' T' T'') and Z.

The amorphous alloy represented by Equation 4 is an alloy which is obtained from a combination of Equations 2 and 3. Therefore, the amorphous alloy of Equation 4 has the advantages of the amorphous alloys of Equations 2 and 3. If the diaphragm is manufactured from the amorphous alloy of Equation 4, it shows a smaller pressure transmission loss percentage and an excellent environmental characteristic to the external magnetic field and excellent corrosion resistance as compared with the conventional diaphragm.

Table 4 below shows a comparison of the diaphragms of Examples 17 to 24 manufactured from the amorphous alloy satisfying Equation 4 and the diaphragms of References 1 and 2.

TABLE 4

| | Alloy composition | Pressure loss percentage (%) | Corrosion resistance |
|---|---|---|---|
| Example 17 | $(Ni_{0.8}Fe_{0.1}Cr_{0.1})_{78}Si_{10}B_{10}P_2$ | 1.9 ~ 2.1 | ⊚ |
| Example 18 | $(Ni_{0.5}Co_{0.3}Cr_{0.1}Cu_{0.1})_{80}Si_8B_{10}C_2$ | 1.7 ~ 1.8 | ⊚ |
| Example 19 | $(Ni_{0.5}Fe_{0.2}Cr_{0.15}Ru_{0.05})_{77}Si_{10}B_{11}Ge_2$ | 1.9 ~ 2.0 | ⊚ |
| Example 20 | $(Co_{0.70}Fe_{0.05}Cr_{0.15}Pt_{0.1})_{74}B_{15}P_8Si_3$ | 2.3 ~ 2.6 | ⊚ |
| Example 21 | $(Ni_{0.85}Fe_{0.05}Cr_{0.07}Nb_{0.03})_{76}Si_{12}B_9Ge_3$ | 1.9 ~ 2.1 | ⊚ |

TABLE 4-continued

| Alloy composition | | Pressure loss percentage (%) | Corrosion resistance |
|---|---|---|---|
| Example 22 | $(Ni_{0.6}Co_{0.2}Ru_{0.05}Cu_{0.05}Mo_{0.10})_{78}Si_{10}B_{10}P_2$ | 1.8 ~ 2.0 | ⦿ |
| Example 23 | $(Ni_{0.7}Co_{0.1}Cr_{0.05}Cu_{0.05}Ir_{0.03}Mn_{0.07})_{75}Si_{15}B_9Al_1$ | 1.9 ~ 2.0 | ⊚ |
| Example 24 | $(Ni_{0.6}Fe_{0.1}Co_{0.1}Ta_{0.05}W_{0.05})_{73}Si_{10}B_{15}C_2$ | 2.0 ~ 2.1 | |
| Reference 1 | SUS316L | 4.4 ~ 5.2 | △ |
| Reference 2 | $Fe_{80}B_{20}$ | 3.8 ~ 4.5 | × |

The diaphragms of Examples 17 to 24 have the compositons represented by Table 4 and are the same as those of Examples 1 to 10 with respect to their thickness and effective diameter.

As appreciated from Table 4, the diaphragms of Examples 17 to 24 reveal a smaller pressure transmission loss percentage and an excellent corrosion resistance as compared with those of References 1 and 2. The diaphragms of Examples 17 to 24 and those of References 1 and 2 were dipped into various kinds of solution and thus tested for corrosion resistance. It has been found that only the diaphragms of References 1 and 2 showed corrosion.

What is claimed is:

1. A pressure sensing device comprising:

a housing assembly having a chamber defined therein;

at least one diaphragm formed of a metal sheet obtained by rapidly quenching a molten metal and having the modulus of longitudinal elasticity, E, of 2,000 to 15,000 Kg/mm² and dividing the chamber of the housing assembly into a first liquid chamber supplied with a measuring fluid and a second liquid chamber sealing a pressure transmission fluid therein, whereby pressure within the first fluid chamber is transmitted into the second fluid chamber through the diaphragm;

said metal sheet forming said diaphragm being made of an amorphous alloy having a composition represented by:

$$(M_{1-x}T_x)_{100-m}Z_m \quad (1)$$

where

M: at least one kind selected from the group consisting of Fe, Co and Ni;

T: at least one kind selected from the group consisting from Ti, Zr, Hf, V, Nb, Ta, Cu, Cr, Au, Ag, Mo, W, Mn, Re, Ru, Rh, Ir, Pt, Pd, Sn, Pb, Sb, Bi, Y and the rare earth elements; and z: at least one kind of B and P, and at least one kind selected from the group consisting of Si, Ge, C and Al, and where $0 \leq x \leq 0.3$ and $10 \leq m \leq 40$ and where the subscripts of $1-x$, x represent the ratio between the number of atoms in M and T and subscripts of $100-m$, m represent an atomic percentage (atm %) of (M T) and z; and sensing means for sensing a pressure variation in the pressure transmission fluid of the second fluid chamber and for sending an output signal to be sensed.

2. A pressure sensing device comprising:

a housing assembly having a chamber defined therein;

at least one diaphragm formed of a metal sheet obtained by rapidly quenching a molten metal and having the modulus of longitudinal elasticity, E, of 2,000 to 15,000 Kg/mm² and dividing the chamber of the housing assembly into a first liquid chamber supplied with a measuring fluid and a second liquid chamber sealing a pressure transmission fluid therein, whereby pressure within the first fluid chamber is transmitted into the second fluid chamber through the diaphragm;

said metal sheet forming said diaphragm being made of an amorphous alloy having a composition represented by:

$$(Ni_{1-x-y}M'_xT'_y)_{100-m}Z_m \quad (2)$$

where

M': at least one kind of Fe and Co;

T': at least one kinde selected from the group consisting of Ti, V, Mn, Zr, Nb, Mo, Hf, Ta, W and the rare earth elements;

Z: at least one kind of B and P, and at least one kind selected from the group consisting of Si, Ge, C and Al;

and where $0 \leq x \leq 0.3$ for M'=Fe; $0 \leq x \leq 0.4$ for M'=Co; $0 \leq y \leq 0.3$ and $10 \leq m \leq 40$, and where the subscripts of $1-x-y$, x, y show the ratio between the number of atoms in Ni, M' and T' and the subscripts $100-m$, m show an atomic percentage (atm %) of (Ni M' T') and Z; and sensing means for sensing a pressure variation in the pressure transmission fluid of the second fluid chamber and for sending an output signal to be sensed.

3. A pressure sensing device comprising:

a housing assembly having a chamber defined therein;

at least one diaphragm formed of a metal sheet obtained by rapidly quenching a molten metal and having the modulus of longitudinal elasticity, E, of 2,000 to 15,000 Kg/mm² and dividing the chamber of the housing assembly into a first liquid chamber supplied with a measuring fluid and a second liquid chamber sealing a pressure transmission fluid therein, whereby pressure within the first fluid chamber is transmitted into the second fluid chamber through the diaphragm;

said metal sheet formin said diaphragm being made of an amorphous alloy having a composition represented by the following Equation:

$$(Ni_{1-x-y}M'_xT'_y)_{100-m}Z_m \quad (3)$$

where

M': at least one kind of Fe and Co;

T': at least one kind selected from the group consisting of Ti, V, Mn, Zr, Nb, Mo, Hf, Ta, W and the rare earth elements;

Z: at least one kind of B and P, and at least one kind selected from the group consisting of Si, Ge, C and Al; and where $0 \leq x \leq 0.3$ for $M'=Fe$; $0 \leq x \leq 0.4$ for $M'=Co$; $0 \leq y \leq 0.2$ and $12 \leq m \leq 30$, and where the subscripts of $1-x-y$, x, y show the ratio between the number of atoms, in Ni, M' and T' and the subscripts of $100-m$, m show an atomic percentage (atm %) of (Ni M' T') and Z; and sensing means for sensing a pressure variation in the pressure transmission fluid of the second fluid chamber and for sending an output signal to be sensed.

4. A pressure sensing device comprising:

a housing assembly having a chamber defined therein;

at least one diaphragm formed of a metal sheet obtained by rapidly quenching a molten metal and having the modulus of longitudinal elasticity, E, of 2,000 to 15,000 Kg/mm² and dividing the chamber of the housing assembly into a first liquid chamber supplied with a measuring fluid and a second liquid chamber sealing a pressure transmission fluid therein, thereby pressure within the first fluid chamber is transmitted into the second fluid chamber through the diaphragm;

said metal sheet forming said diaphragm being made of an amorphous alloy having a composition represented by the following Equation:

$$(M_{1-x}T''_x)_{100-m}Z_m \qquad (4)$$

where

M: at least one kind selected from the group consisting of Fe, Co and Ni;

T'': at least one kind selected from Cr, Cu and the elements of the platinum group; and Z: at least one kind of B and P and at least one kind selected from the group consisting of Si, Ge, C and Al, and where $0.02 \leq x \leq 0.30$ and $10 \leq m \leq 40$ and the subscripts of $1-x$, x show the ratio between the number of atoms in M and T'' and the subscripts of $100-m$, m show an atomic percentage (atm %) of (M T'') and $Z_m$; and sensing means for sensing a pressure variation in the pressure transmission fluid of the second fluid chamber and for sending an output signal to be sensed.

5. A pressure sensing device comprising:

a housing assembly having a chamber defined therein;

at least one diaphragm formed of a metal sheet obtained by rapidly quenching a molten metal and having the modulus of longitudinal elasticity, E, of 2,000 to 15,000 Kg/mm² and dividing the chamber of the housing assembly into a first liquid chamber supplied with a measuring fluid and a second liquid chamber sealing a pressure transmission fluid therein, whereby pressure within the first fluid chamber is transmitted into the second fluid chamber through the diaphragm;

said metal sheet forming said diaphragm being made of an amorphous alloy having a composition represented by the following Equation:

$$(Ni_{1-x-y-z}M'_xT'_yT''_z)_{100-m}Z_m \qquad (5)$$

where

M': at least one kind of Fe and Co;

T': at least one kind selected from the group consisting of Ti, V, Mn, Zr, Nb, Mo, Hf, Ta, W and the rare earth elements;

T'': at least one kind selected from Cr, Cu and the elements of the platinum group; and Z: at least one kind of B and P and at least one kind selected from the group consisting of Si, Ge, C and Al, where $x \leq 0.3$ for $M'=Fe$; $x \leq 0.4$ for $M'=Co$; $0 \leq y \leq 0.20$; $0.02 \leq z \leq 0.20$; $0.02 \leq y+z \leq 0.30$ and $10 < m < 40$ and where the subscripts of $1-x-y-z$, x, y, z show the ratio between the number of atoms in Ni, M', T' and T'' and the subscripts of $100-m$, m show an atomic percentage of (Ni M' T' T'') and Z; and sensing means for sensing a pressure variation in the pressure transmission fluid of the second fluid chamber and for sending an output signal to be sensed.

* * * * *

UNITED STATES PATENT AND TRADEMARK OFFICE
CERTIFICATE OF CORRECTION

PATENT NO. : 4,776,218
DATED : Oct. 11, 1988
INVENTOR(S) : Takao SAWA et al.

It is certified that error appears in the above-identified patent and that said Letters Patent is hereby corrected as shown below:

On the Title Page, Item [75]:

The second inventor's name should read as follows:

-- Masashi Sahashi --

Signed and Sealed this

Thirteenth Day of June, 1989

Attest:

DONALD J. QUIGG

*Attesting Officer*      *Commissioner of Patents and Trademarks*